(12) United States Patent
Chen et al.

(10) Patent No.: US 8,908,541 B2
(45) Date of Patent: Dec. 9, 2014

(54) METHODS, SYSTEMS, AND COMPUTER READABLE MEDIA FOR INTELLIGENT OPTIMIZATION OF DIGITAL SIGNAL PROCESSOR (DSP) RESOURCE UTILIZATION IN A MEDIA GATEWAY

(75) Inventors: Weisheng Chen, Allen, TX (US); Hao Hou, McKinney, TX (US); Richard James Bianconi, Rowlett, TX (US)

(73) Assignee: Genband US LLC, Plano, TX (US)

( * ) Notice: Subject to any disclaimer, the term of this patent is extended or adjusted under 35 U.S.C. 154(b) by 865 days.

(21) Appl. No.: 12/535,655

(22) Filed: Aug. 4, 2009

(65) Prior Publication Data

US 2011/0032927 A1 Feb. 10, 2011

(51) Int. Cl.
| | |
|---|---|
| H04J 1/16 | (2006.01) |
| H04L 12/66 | (2006.01) |
| H04L 12/28 | (2006.01) |
| H04J 3/16 | (2006.01) |
| H04L 12/925 | (2013.01) |

(52) U.S. Cl.
CPC .............. H04L 12/66 (2013.01); H04L 47/722 (2013.01)
USPC ............ 370/252; 370/356; 370/401; 370/468

(58) Field of Classification Search
CPC ... H04L 12/6418; H04L 65/80; H04L 65/103; H04L 65/104; H04L 65/1083; H04M 7/006
See application file for complete search history.

(56) References Cited

U.S. PATENT DOCUMENTS

| | | |
|---|---|---|
| 3,652,798 A | 3/1972 | McNeilly et al. |
| 4,048,446 A | 9/1977 | Hafner et al. |
| 4,455,649 A | 6/1984 | Esteban et al. |
| 4,545,052 A | 10/1985 | Steierman |
| 5,295,136 A | 3/1994 | Ashley et al. |
| 5,375,121 A | 12/1994 | Nishino et al. |
| 5,612,957 A | 3/1997 | Gregerson et al. |
| 5,710,976 A | 1/1998 | Hill et al. |
| 5,740,157 A | 4/1998 | Demiray et al. |

(Continued)

FOREIGN PATENT DOCUMENTS

| | | |
|---|---|---|
| CA | 2336699 A1 | 1/2000 |
| CN | 1504039 A | 6/2004 |

(Continued)

OTHER PUBLICATIONS

Final Official Action for U.S. Appl. No. 11/351,339 (Mar. 1, 2010).

(Continued)

*Primary Examiner* — Melanie Jagannathan
(74) *Attorney, Agent, or Firm* — Jenkins, Wilson, Taylor & Hunt, P.A.

(57) ABSTRACT

The subject matter described herein includes methods, systems, and computer readable media for intelligent optimization of digital signal processor (DSP) resource utilization in a media gateway. In one method, it is determined in a media gateway whether predetermined conditions exist for DSP-less IP-IP switching for a call. In response to determining that the predetermined conditions exist, DSP-less IP-IP switching is implemented for the call in the media gateway. After implementing the DSP-less IP-IP switching for the call, it is determined whether a predetermined event occurs that requires insertion of DSP resources during the call. In response to determining that the predetermined event occurs, the DSP resources are inserted into the call during the call.

25 Claims, 5 Drawing Sheets

(56) References Cited

U.S. PATENT DOCUMENTS

| | | |
|---|---|---|
| 5,905,873 A | 5/1999 | Hartmann et al. |
| 5,930,264 A | 7/1999 | Nguyen |
| 5,933,487 A | 8/1999 | Strickland |
| 5,956,673 A | 9/1999 | Weaver et al. |
| 5,995,923 A | 11/1999 | Mermelstein et al. |
| 5,999,529 A | 12/1999 | Bernstein et al. |
| 6,006,189 A | 12/1999 | Strawczynski et al. |
| 6,009,467 A | 12/1999 | Ratcliff et al. |
| 6,026,086 A | 2/2000 | Lancelot et al. |
| 6,031,904 A | 2/2000 | An et al. |
| 6,046,999 A | 4/2000 | Miki et al. |
| 6,078,595 A | 6/2000 | Jones et al. |
| 6,141,784 A | 10/2000 | Davis et al. |
| 6,144,667 A | 11/2000 | Doshi et al. |
| 6,147,988 A | 11/2000 | Bartholomew et al. |
| 6,172,990 B1 | 1/2001 | Deb et al. |
| 6,185,424 B1 | 2/2001 | Pon et al. |
| 6,246,879 B1 | 6/2001 | Segura et al. |
| 6,256,612 B1 | 7/2001 | Vo et al. |
| 6,272,358 B1 | 8/2001 | Brent et al. |
| 6,275,578 B1 | 8/2001 | De Trana et al. |
| 6,295,302 B1 | 9/2001 | Hellwig et al. |
| 6,298,055 B1 | 10/2001 | Wildfeuer |
| 6,324,409 B1 | 11/2001 | Shaffer et al. |
| 6,324,515 B1 | 11/2001 | Rabipour et al. |
| 6,339,594 B1 | 1/2002 | Civanlar et al. |
| 6,353,666 B1 | 3/2002 | Henderson et al. |
| 6,389,016 B1 | 5/2002 | Sabaa et al. |
| 6,392,993 B1 | 5/2002 | Hamilton et al. |
| 6,414,964 B1 | 7/2002 | Holmquist et al. |
| 6,424,637 B1 | 7/2002 | Pecen et al. |
| 6,463,454 B1 | 10/2002 | Lumelsky et al. |
| 6,549,945 B1 | 4/2003 | Sinibaldi et al. |
| 6,553,423 B1 | 4/2003 | Chen |
| 6,574,469 B1 | 6/2003 | Xiang et al. |
| 6,600,738 B1 | 7/2003 | Alperovich et al. |
| 6,614,781 B1 | 9/2003 | Elliott et al. |
| 6,625,169 B1 | 9/2003 | Tofano |
| 6,647,428 B1 | 11/2003 | Bannai et al. |
| 6,658,064 B1 | 12/2003 | Rotola-Pukkila et al. |
| 6,671,367 B1 | 12/2003 | Graf et al. |
| 6,693,996 B2 | 2/2004 | Mansfield |
| 6,721,269 B2 | 4/2004 | Cao et al. |
| 6,731,627 B1 | 5/2004 | Gupta et al. |
| 6,731,647 B2 | 5/2004 | Yao |
| 6,765,931 B1 | 7/2004 | Rabenko et al. |
| 6,778,517 B1 | 8/2004 | Lou et al. |
| 6,781,983 B1 | 8/2004 | Armistead |
| 6,795,437 B1 | 9/2004 | Räsänen et al. |
| 6,842,461 B2 | 1/2005 | Harris |
| 6,845,089 B1 | 1/2005 | Gu et al. |
| 6,850,778 B1 | 2/2005 | Honkala et al. |
| 6,850,883 B1 | 2/2005 | Kapanen et al. |
| 6,865,220 B2 | 3/2005 | Abrishami |
| 6,876,646 B1 | 4/2005 | Dore et al. |
| 6,885,638 B2 | 4/2005 | Xu et al. |
| 6,898,208 B1 | 5/2005 | Sligo et al. |
| 6,944,166 B1 | 9/2005 | Perinpanathan et al. |
| 6,956,816 B1 | 10/2005 | Alexander et al. |
| 6,967,958 B2 | 11/2005 | Ono et al. |
| 6,967,972 B1 | 11/2005 | Volftsun et al. |
| 6,973,024 B1 | 12/2005 | Joseph et al. |
| 6,983,163 B2 | 1/2006 | Sato et al. |
| 6,985,530 B1 | 1/2006 | Zerbe |
| 6,990,340 B2 | 1/2006 | Tamura et al. |
| 6,999,459 B1 | 2/2006 | Callon et al. |
| 7,006,489 B2 | 2/2006 | Li et al. |
| 7,023,819 B2 | 4/2006 | Falsafi |
| 7,054,318 B2 | 5/2006 | Eneroth et al. |
| 7,054,320 B1 | 5/2006 | Lee et al. |
| 7,058,085 B2 | 6/2006 | Earnshaw et al. |
| 7,068,623 B1 | 6/2006 | Barany et al. |
| 7,072,358 B2 | 7/2006 | Suvanen |
| 7,082,143 B1 | 7/2006 | LeBlanc et al. |
| 7,085,289 B2 | 8/2006 | Cromer et al. |
| 7,089,011 B1 | 8/2006 | Mangal |
| 7,095,733 B1 | 8/2006 | Yarlagadda et al. |
| 7,103,021 B2 | 9/2006 | Jou |
| 7,106,701 B2 | 9/2006 | Stümpert et al. |
| 7,133,694 B2 | 11/2006 | Lanig et al. |
| 7,136,375 B1 | 11/2006 | Koistinen |
| 7,162,024 B1 | 1/2007 | Wah et al. |
| 7,174,156 B1 | 2/2007 | Mangal |
| 7,180,892 B1 | 2/2007 | Tackin |
| 7,181,209 B2 | 2/2007 | Tamura |
| 7,203,226 B1 | 4/2007 | Rabipour et al. |
| 7,233,595 B1 | 6/2007 | Hollis et al. |
| 7,233,600 B1 * | 6/2007 | Chau et al. ............ 370/431 |
| 7,240,000 B2 | 7/2007 | Harada |
| 7,245,589 B2 | 7/2007 | Neulist et al. |
| 7,245,931 B2 | 7/2007 | Wang et al. |
| 7,280,530 B2 | 10/2007 | Chang et al. |
| 7,304,984 B2 | 12/2007 | Butler et al. |
| 7,305,229 B2 | 12/2007 | Fox et al. |
| 7,349,698 B2 | 3/2008 | Gallagher et al. |
| 7,369,859 B2 | 5/2008 | Gallagher |
| 7,400,881 B2 | 7/2008 | Kallio |
| 7,411,941 B2 | 8/2008 | Chu et al. |
| 7,471,655 B2 | 12/2008 | Gallagher et al. |
| 7,483,374 B2 | 1/2009 | Nilakantan et al. |
| 7,593,415 B2 | 9/2009 | Li et al. |
| 7,639,601 B2 | 12/2009 | Rabipour et al. |
| 7,729,346 B2 | 6/2010 | Lee et al. |
| 7,792,150 B2 * | 9/2010 | Chen et al. ............ 370/477 |
| 7,830,864 B2 | 11/2010 | Li |
| 7,835,346 B2 | 11/2010 | He et al. |
| 8,254,372 B2 | 8/2012 | Rabipour et al. |
| 8,442,196 B1 * | 5/2013 | Shaffer et al. ........ 379/202.01 |
| 2001/0024960 A1 | 9/2001 | Mauger |
| 2001/0036158 A1 | 11/2001 | Hallenstal et al. |
| 2001/0043577 A1 | 11/2001 | Barany et al. |
| 2002/0001302 A1 | 1/2002 | Pickett |
| 2002/0013147 A1 | 1/2002 | Fauconnier et al. |
| 2002/0019881 A1 | 2/2002 | Bokhari et al. |
| 2002/0027930 A1 | 3/2002 | Huh et al. |
| 2002/0049860 A1 | 4/2002 | Koistinen |
| 2002/0054571 A1 | 5/2002 | Falsafi |
| 2002/0072364 A1 | 6/2002 | Tamura |
| 2002/0106029 A1 | 8/2002 | Bunn et al. |
| 2002/0118673 A1 | 8/2002 | Abrishami et al. |
| 2003/0005106 A1 | 1/2003 | Isoda |
| 2003/0032440 A1 | 2/2003 | Sato et al. |
| 2003/0058822 A1 | 3/2003 | Jou |
| 2003/0063569 A1 | 4/2003 | Kalliokulju et al. |
| 2003/0072273 A1 | 4/2003 | Aiello et al. |
| 2003/0093509 A1 | 5/2003 | Li et al. |
| 2003/0112796 A1 | 6/2003 | Kwan |
| 2003/0117954 A1 | 6/2003 | De Neve et al. |
| 2003/0123466 A1 | 7/2003 | Somekh et al. |
| 2003/0123485 A1 | 7/2003 | Yi et al. |
| 2003/0133423 A1 | 7/2003 | LaDue |
| 2003/0134653 A1 | 7/2003 | Sarkkinen et al. |
| 2003/0135376 A1 | 7/2003 | Harada |
| 2003/0135784 A1 | 7/2003 | Yamaguchi et al. |
| 2003/0189720 A1 | 10/2003 | Bei et al. |
| 2003/0195981 A1 | 10/2003 | Graf et al. |
| 2003/0210659 A1 | 11/2003 | Chu et al. |
| 2003/0233274 A1 | 12/2003 | Urken et al. |
| 2004/0008652 A1 | 1/2004 | Tanzella et al. |
| 2004/0010582 A1 | 1/2004 | Oliver |
| 2004/0032860 A1 * | 2/2004 | Mundra et al. .......... 370/352 |
| 2004/0037224 A1 | 2/2004 | Choi et al. |
| 2004/0037314 A1 | 2/2004 | Spear |
| 2004/0047364 A1 | 3/2004 | Briggs et al. |
| 2004/0066745 A1 | 4/2004 | Joe |
| 2004/0073424 A1 | 4/2004 | Geppert et al. |
| 2004/0090989 A1 | 5/2004 | Kobayashi |
| 2004/0100914 A1 | 5/2004 | Hellwig et al. |
| 2004/0101125 A1 | 5/2004 | Graf et al. |
| 2004/0110539 A1 | 6/2004 | El-Maleh et al. |
| 2004/0114588 A1 | 6/2004 | Bhaskaran |
| 2004/0114626 A1 | 6/2004 | Cline et al. |
| 2004/0114922 A1 | 6/2004 | Hardee |
| 2004/0131025 A1 | 7/2004 | Dohler et al. |

(56) References Cited

U.S. PATENT DOCUMENTS

| | | |
|---|---|---|
| 2004/0131051 A1 | 7/2004 | Rabipour et al. |
| 2004/0133419 A1 | 7/2004 | El-Maleh et al. |
| 2004/0136447 A1 | 7/2004 | LeBlanc |
| 2004/0196867 A1 | 10/2004 | Ejzak et al. |
| 2004/0208132 A1 | 10/2004 | Neulist et al. |
| 2004/0228279 A1 | 11/2004 | Midtun et al. |
| 2004/0252681 A1 | 12/2004 | Rabipour et al. |
| 2004/0254786 A1 | 12/2004 | Kirla et al. |
| 2004/0266426 A1 | 12/2004 | Marsh et al. |
| 2004/0267882 A1* | 12/2004 | Whynot et al. ............... 709/204 |
| 2004/0267897 A1 | 12/2004 | Hill et al. |
| 2005/0007973 A1 | 1/2005 | Jang et al. |
| 2005/0013281 A1 | 1/2005 | Milton et al. |
| 2005/0013286 A1 | 1/2005 | Holland et al. |
| 2005/0027948 A1 | 2/2005 | Marlan et al. |
| 2005/0048973 A1 | 3/2005 | Hou et al. |
| 2005/0064907 A1 | 3/2005 | Nealon |
| 2005/0073977 A1 | 4/2005 | Vanghi et al. |
| 2005/0074017 A1 | 4/2005 | Qian et al. |
| 2005/0076108 A1 | 4/2005 | Li et al. |
| 2005/0084094 A1 | 4/2005 | Gass et al. |
| 2005/0085181 A1 | 4/2005 | Tao |
| 2005/0099940 A1 | 5/2005 | Ohenoja et al. |
| 2005/0105512 A1 | 5/2005 | Myhre et al. |
| 2005/0124299 A1 | 6/2005 | Scribano et al. |
| 2005/0157823 A1 | 7/2005 | Sudhakar |
| 2005/0172013 A1 | 8/2005 | Tan et al. |
| 2005/0185604 A1 | 8/2005 | Agarwal |
| 2005/0195829 A1 | 9/2005 | Ward |
| 2005/0232232 A1 | 10/2005 | Farber et al. |
| 2005/0265279 A1 | 12/2005 | Markovic et al. |
| 2005/0267746 A1 | 12/2005 | Jelinek et al. |
| 2005/0286466 A1 | 12/2005 | Tagg et al. |
| 2006/0046658 A1 | 3/2006 | Cruz et al. |
| 2006/0050664 A1 | 3/2006 | Guey |
| 2006/0062225 A1 | 3/2006 | Li et al. |
| 2006/0067221 A1 | 3/2006 | Lee et al. |
| 2006/0072555 A1 | 4/2006 | St Hilaire et al. |
| 2006/0092927 A1 | 5/2006 | Li et al. |
| 2006/0133353 A1 | 6/2006 | Wang et al. |
| 2006/0154686 A1 | 7/2006 | Sarkkinen et al. |
| 2006/0193289 A1 | 8/2006 | Ronneke et al. |
| 2006/0198347 A1 | 9/2006 | Hurtta et al. |
| 2006/0209873 A1 | 9/2006 | Knabchen et al. |
| 2006/0229068 A1 | 10/2006 | Niemela et al. |
| 2006/0268845 A1 | 11/2006 | He et al. |
| 2006/0286981 A1 | 12/2006 | Suumaki et al. |
| 2006/0291454 A1 | 12/2006 | Ali |
| 2006/0291483 A1 | 12/2006 | Sela |
| 2007/0011727 A1 | 1/2007 | Mielenz et al. |
| 2007/0041320 A1 | 2/2007 | Chen et al. |
| 2007/0041360 A1 | 2/2007 | Gallagher et al. |
| 2007/0043558 A1 | 2/2007 | Schwarz et al. |
| 2007/0123196 A1 | 5/2007 | Tamura |
| 2007/0127357 A1 | 6/2007 | Tamura |
| 2007/0127436 A1 | 6/2007 | Karimi-Cherkandi et al. |
| 2007/0135165 A1 | 6/2007 | Junghanns et al. |
| 2007/0140214 A1 | 6/2007 | Zoltan |
| 2007/0140293 A1 | 6/2007 | Agarwal et al. |
| 2007/0165636 A1 | 7/2007 | He et al. |
| 2007/0171841 A1 | 7/2007 | Witzel et al. |
| 2007/0186002 A1 | 8/2007 | Campbell et al. |
| 2007/0286082 A1 | 12/2007 | Hikspoors et al. |
| 2008/0008312 A1 | 1/2008 | Ganesamoorthi et al. |
| 2008/0039087 A1 | 2/2008 | Gallagher et al. |
| 2008/0102794 A1 | 5/2008 | Keevill et al. |
| 2008/0123596 A1 | 5/2008 | Gallagher et al. |
| 2008/0146208 A1* | 6/2008 | Ejzak et al. ................... 455/416 |
| 2008/0151845 A1 | 6/2008 | Jaakkola et al. |
| 2008/0192760 A1* | 8/2008 | Baeder et al. ................. 370/401 |
| 2008/0225765 A1 | 9/2008 | Marinier et al. |
| 2008/0288245 A1 | 11/2008 | El-Maleh et al. |
| 2008/0293416 A1 | 11/2008 | Yi et al. |
| 2008/0316980 A1 | 12/2008 | Ahlen et al. |
| 2010/0305943 A1 | 12/2010 | Witzel et al. |

FOREIGN PATENT DOCUMENTS

| | | |
|---|---|---|
| CN | 101341730 | 1/2009 |
| CN | ZL 02808634.1 | 4/2009 |
| CN | ZL 200780009550.8 | 4/2012 |
| DE | 198 29 822 A1 | 1/2000 |
| EP | 0 907 280 A2 | 4/1999 |
| EP | 1 017 217 A2 | 7/2000 |
| EP | 1 076 466 A1 | 2/2001 |
| EP | 1 465 445 A1 | 10/2004 |
| EP | 1 364 499 B1 | 7/2009 |
| FI | 20011715 | 2/2003 |
| GB | 2363295 | 12/2001 |
| GB | 2 389 486 A | 12/2003 |
| WO | WO 99/29136 | 6/1999 |
| WO | WO 99/40569 | 8/1999 |
| WO | WO 00/51330 | 8/2000 |
| WO | WO 00/70885 | 11/2000 |
| WO | WO 01/26390 A1 | 4/2001 |
| WO | WO 02/052414 A1 | 7/2002 |
| WO | WO 02/069588 A2 | 9/2002 |
| WO | WO 03/019961 A1 | 3/2003 |
| WO | WO 03/043299 A1 | 5/2003 |
| WO | WO 03/103313 A1 | 12/2003 |
| WO | WO 2004/019568 A2 | 3/2004 |
| WO | WO 2004/075582 A1 | 9/2004 |
| WO | WO 2005/050960 A1 | 6/2005 |
| WO | WO 2005/089055 | 9/2005 |
| WO | WO 2005/096585 A1 | 10/2005 |
| WO | WO 2007/022461 A2 | 2/2007 |
| WO | WO 2007/084417 A2 | 7/2007 |

OTHER PUBLICATIONS

Notice of Allowance and Fee(s) Due for U.S. Appl. No. 11/207,572 (Jan. 26, 2010).
Final Official Action for U.S. Appl. No. 11/121,626 (Jan. 12, 2010).
Notice of Allowance and Fee(s) Due for U.S. Appl. No. 11/230,029 (Jan. 12, 2010).
Official Action for U.S. Appl. No. 11/351,339 (Apr. 1, 2009).
Notice of Allowance and Fee(s) Due for U.S. Appl. No. 11/351,339 (Sep. 26, 2008).
R.L. Bunting (Editor), "Transcoder Free Operation," $3^{rd}$ Generation Partnership, Version 1.0, Project 2 (Mar. 18, 2004).
Notice of Allowance and Fee(s) Due for U.S. Appl. No. 11/351,339 (Jun. 25, 2010).
Notice of Allowance and Fee(s) Due for U.S. Appl. No. 11/121,626 (Jun. 24, 2010).
Notice of Allowance and Fee(s) Due for U.S. Appl. No. 11/121,626 (May 27, 2010).
Interview Summary for U.S. Appl. No. 11/121,626 (May 21, 2010).
Notice of Allowance and Fee(s) Due for U.S. Appl. No. 11/207,572 (May 3, 2010).
Final Official Action for U.S. Appl. No. 11/207,572 (May 28, 2009).
Official Action for U.S. Appl. No. 11/121,626 (May 18, 2009).
Notice of Allowance and Fee(s) Due for U.S. Appl. No. 11/297,941 (May 15, 2009).
Final Official Action for U.S. Appl. No. 11/230,029 (May 14, 2009).
Final Official Action for U.S. Appl. No. 11/297,941 (Jan. 22, 2009).
Communication under Rule 71(3) EPC for European Patent Application No. 02 709 657.7 (Jan. 9, 2009).
Notice of Grant of Patent Right for Invention for Chinese Patent Application No. 02808634.1 (Dec. 26, 2008).
Final Official Action for U.S. Appl. No. 11/121,626 (Nov. 13, 2008).
Official Action for U.S. Appl. No. 11/230,029 (Oct. 29, 2008).
Official Action for U.S. Appl. No. 11/207,572 (Oct. 6, 2008).
Official Action for Chinese Patent Application No. 02808634.1 (Jun. 20, 2008).
Official Action for U.S. Appl. No. 11/297,941 (May 1, 2008).
Communication pursuant to Rules 161 and 162 EPC for European application No. 06813571.4 (Mar. 28, 2008).
Official Action for U.S. Appl. No. 11/121,626 (Feb. 20, 2008).
Notification of Transmittal of the International Search Report and the Written Opinion of the International Searching Authority, or the Declaration for International Application No. PCT/US07/00942 (Oct. 12, 2007).

(56) References Cited

OTHER PUBLICATIONS

Notification of Transmittal of the International Search Report and the Written Opinion of the International Searching Authority, or the Declaration for International Application No. PCT/US06/32484 (May 7, 2007).
International Search Report for International Application No. PCT/US2006/028549 (Dec. 11, 2006).
Communication pursuant to Article 96(2) EPC for European Application No. 02709657 (Jan. 23, 2006).
Notice of Allowance and Fee(s) Due for U.S. Appl. No. 09/792,265 (Sep. 16, 2005).
Final Official Action for U.S. Appl. No. 09/792,265 (Jun. 15, 2005).
"Third Generation Partnership Project; Technical Specification Group Core Network and Terminals; Interworking Between the IP multimedia (IM) Core Network (CN) Subsystem and Cirecuit (CS) Networks (Release 6)" 3GPP TS 29.163, pp. 1-128 (Jun. 2005).
Agilent Technologies, "UMTS Network and Service Assurance," International Engineering Consortium, http://www.iec.org/online/tutorials/agilent_umts_network/topic03.html, pp. 1-4 (Copyright 2005).
"Digital Cellular Telecommunications System Phase (2+); Universal Mobile Telecommunications System (UMTS); AMR Speech Codec, Wideband; Interface to Iu and Uu (3GPP TS 26.202 version 6.0.0 Release 6)," Global System for Mobile Communications ETSI TS 126 202, pp. 1-14 (Dec. 2004).
Official Action for U.S. Appl. No. 09/792,265 (Oct. 4, 2004).
Notification of Transmittal of International Preliminary Examination Report for international application No. PCT/US02/05410 (Dec. 5, 2003).
Written Opinion for International Application No. PCT/US02/05410 (Jun. 13, 2003).
Notification of Transmittal of the International Search Report or the Declaration for PCT/US02/05410 (Dec. 27, 2002).
Sjoberg et al., "Real-Time Transport (RTP) Payload Format and File Storage Format for the adaptive Multi-Rate (AMR) and Adaptive Multi-Rate Wideband (AMR-WB) Audio Codecs," Network Working Group, http://www.apps.ietf.org/rfc/rfc3267html, pp. 1-48 (Jun. 2002).
"Third Generation Partnership Project," Meeting Report v3.0.0, 3GPP TSG-TrFO Workshop#04, pp. 1-18 (Oct. 17-19, 2000).
Laurence, M. et al., "Voice Over ATM: A Hybrid TDM/ATM Design Approach," electronic Engineering, Morgan-Grampian Ltd., vol. 71, No. 869, Jun. 1999, pp. 81-82, 84, and 86.
Singer, Josef et al., "Narrow band Services Over ATM Networks: Evaluation of Trunking Methods," World Telecommunications Congress, vol. 2, Sep. 21, 1997, pp. 17-25.
Interview Summary for U.S. Appl. No. 11/207,572 (Oct. 16, 2009).
Interview Summary for U.S. Appl. No. 11/121,626 (Oct. 15, 2009).
Final Official Action for U.S. Appl. No. 10/782,754 (Feb. 15, 2011).
Official Action for U.S. Appl. No. 10/782,754 (Aug. 3, 2010).
Official Action for U.S. Appl. No. 10/782,754 (Feb. 26, 2010).
Official Action for U.S. Appl. No. 10/782,754 (Sep. 4, 2009).
"$3^{rd}$ Generation Partnership Project; Technical Specification Group Services and System Aspects; Comfort Noise Aspects for Enhanced Full Rate (EFR) Speech Traffic Channels (Release 7)," 3GPP TS 46.062 V7.0.0 (Jun. 2007).
"$3^{rd}$ Generation Partnership Project; Technical Specification Group Services and System Aspects; Enhanced Full Rate (EFR) Speech Transcoding (Release 7)," 3GPP TS 46.060 V7.0.0 (Jun. 2007).
$3^{rd}$ Generation Partnership Project; Technical Specification Group Services and System Aspects; Inband Tandem Free Operation (TFO) of Speech Codecs; Service Description; Stage 3 (Release 7) 3GPP TS 28.062 V7.0.0, pp. 1-183 (Jun. 2007).
Series G: Transmission Systems and Media, Digital Systems and Networks; Digital Terminal Equipments—Coding of Analogue Signals by Methods Other than PCM; Coding of Speech at 8 kbit/s Using Conjugate-Structure Algebraic-Code-Excited Linear Prediction (CS-ACELP), pp. 1-146 (Jan. 2007).
"$3^{rd}$ Generation Partnership Project; Technical Specification Group Core Network and Terminals; Core Network Nb Interface user Plane Protocols (Release 5)," 3GPP TS 29.415 V5.2.0, pp. 1-14 (Dec. 2006).
"Rationale for Reverse Direction Capability List," Study Group 16, ITU—Telecommunication Standardization Sector, Nortel Networks (Nov. 2005).
"Series H: Audiovisual and Multimedia Systems; Infrastructure of Audiovisual Servies—Communication Procedures; Gateway Control Protocol: Version 3," ITU-T H.248.1, pp. 1-206 (Sep. 2005).
"$3^{rd}$ Generation Partnership Project; Technical Specification Group Services and System Aspects; Vocabulary for 3GPP Specification (Release 7)," 3GPP TR 21.905 V7.0.0, pp. 1-54 (Sep. 2005).
"Digital Cellular Telecommunications System (Phase2+); Universal Mobile Telecommunications System (UMTS) Inband Tandem Free Operation (TFO) of Speec Codecs," (Dec. 2004), ETSI TS 128 062 v. 6.1.0, European Telecommunications Standards Institute (Dec. 2004).
$3^{rd}$ Generation Partnership Project; Technical Specification Group Services and System Aspects; Mandatory Speech Codec Speech Processing Functions; Adaptive Multi-Rate (AMR) Speech Codec Frame Structure (Release 6), 3GPP TS 26.101 V6.0.0, pp. 1-20 (Sep. 2004).
International Search Report and Written Opinion of PCT/CA2004/000300 mailed on Jul. 15, 2004.
"Series G: Transmission Systems and Media, Digital Systems and Networks," ITU-T, G.161, International Telecommunication Union (Jun. 2004).
Partial International Search Report, PCT/CA03/00972 (Nov. 3, 2003).
Yoo et al., "A Media Stream Processing of VoIP Media Gateway," IEEE, p. 91-94 (Copyright 2003).
"$3^{rd}$ Generation Parnetship Project; Technical Specification Group Radio Access Network; UTRAN Iu Interface User Plane Protocols (Release 4)," 3GPP TS 25.415 V4.7.0, pp. 1-62 (Dec. 2002).
ETSI: Digital Cellular Telecommunication System (Phase 2+) (GSM); Universal Mobile Telecommunications System (UMTS): Inband Tandem Free Operation (TFO) of Speech Codecs; Service Description; Stage 3 (3GPP TS 28.062 version 5.0.0 Release 5) ETSI TS 28 062 V5.0.0, xx,xx, Mar. 2002, pp. 14-19, 35-51, 56-59, 81-88, 164-168, XP002248624.
"$3^{rd}$ Generation Partnership Project; Technical Specification Group Core Network; Bearer-independent Circuit-Switched Core Network; Stage 2 (Release 4)," 3GPP TS 23.205 V4.4.0, pp. 1-183 (Mar. 2002).
"$3^{rd}$ Generation Partnership Project; Technical Specification Group Services and System Aspects; Inband Tandem Free Operation (TFO) of Speech Codecs; Service Description; Stage 3 (Release 5)," 3GPP TS 28.062 V5.0.0, pp. 1-175 (Mar. 2002).
"Implementing Media Gateway Control Protocols," RADVision, pp. 1-16 (Jan. 27, 2002).
"3rd Generation Partnership Project; Technical Specification Group Core Network; Out of Band Transcoder Control—Stage 2; (Release 4)," 3GPP TS 23.153 V4.4.0 Release 4, pp. 1-45 (Dec. 2001).
"Series G: Transmission Systems and Media, Digital Systems and Networks; Digital Transmission Systems—Terminal Equipments—Coding of Analogue Signals by Pulse Code Modulation," ITU-T G.711, Appendix II, pp. 1-18 (Feb. 2000).
ETSI: "Digital Cellular Telecommunications System (Phase2+): Inband Tandem Free Operation (TFO) of Speech Codecs; Service Description; Stage 3 (GSM 04.53 version 1.6.0)" GSM Global System for Mobile Telecommunications, Online, Oct. 1998, pp. 1-69, XP002283034.
"General Aspects of Digital Transmission Systems; Terminal Equipments; Pulse Code Modulation (PCM) of Voice Frequencies," ITU-T G.711, pp. 1-12 (Nov. 1988).
Schulzrinne, H., "RTP Payload for DTMF Digits, Telephony Tones and Telephony Signals," Network Working Group, IETF RFC 2833, pp. 1-29, (May 2000).
Notice of Allowance and Fee(s) Due for U.S. Appl. No. 10/782,754 (Apr. 26, 2012).
Second Office Action for Chinese Patent Application No. 200680038614.2 (Jan. 31, 2012).
Interview Summary for U.S. Appl. No. 10/782,754 (Oct. 27, 2011).

(56) References Cited

OTHER PUBLICATIONS

Official Action for U.S. Appl. No. 10/782,754 (Sep. 28, 2011).
Notification of Transmittal of the International Search Report and the Written Opinion of the International Searching Authority, or the Declaration for International Application No. PCT/US2010/044314 (Mar. 24, 2011).
Chinese Official Action for Chinese Patent Application No. 200780009550.8 (Dec. 21, 2010).
Chinese Official Action for Chinese Patent Application No. 200680038614.2 (Oct. 27, 2010).
Fourth Office Action for for Chinese Patent Application 200680038614.2 (Apr. 1, 2013).
Third Office Action for for Chinese Patent Application 200680038614.2 (Oct. 26, 2012).
Extended European Search Report for European Application No. 06813571.4 (Jul. 23, 2012).
Extended European Search Report for European Application No. 07716585.0 (Jul. 10, 2012).
Notice of Granting Patent Right for Invention for Chinese Patent Application No. 200780009550.8 (Nov. 28, 2011).
"Digital cellular telecommunications system (Phase 2+); Universal Mobile Telecommunications System (UMTS); Interworking between the IP Multimedia (IM) Core Network (CN) subsystem and Circuit Switched (CS) networks (3GPP TS 29.163 version 7.1.0 Release 7)," ETSI TS 129 163 V7.1.0 (Dec. 2005).
Editors TS 23 153: "Draft TS 23.153 Version 2.1.0," 3GPP Draft; N4-000892, 3rd Generation Partnership Project (3GPP), Mobile Competence Centre; 650, Route Des Lucioles ; F-06921 Sophia-Antipolis Cedex ; France, vol. CN WG4, no. Stockholm, Sweden (Jan. 5, 2001).

* cited by examiner

METHODS, SYSTEMS, AND COMPUTER READABLE MEDIA FOR INTELLIGENT OPTIMIZATION OF DIGITAL SIGNAL PROCESSOR (DSP) RESOURCE UTILIZATION IN A MEDIA GATEWAY

TECHNICAL FIELD

The subject matter described herein relates to controlling DSP resource utilization in a media gateway. More particularly, the subject matter described herein relates to methods, systems, and computer readable media for intelligent optimization of digital signal processor (DSP) resource utilization in a media gateway.

BACKGROUND

Media gateways switch packets for IP to IP (IP-IP) and IP to TDM calls. One of the most expensive resources in a media gateway is digital signal processors (DSPs). DSPs are needed for calls that require special processing, such as transcoding or feature activation. In a media gateway architecture where DSP resources are shared among all calls, it is desirable to intelligently allocate DSP resources to increase the switching capacity of a media gateway. Accordingly, there exists a need for methods, systems, and computer readable media for intelligent optimization of DSP resource utilization in a media gateway.

SUMMARY

The subject matter described herein includes methods, systems, and computer readable media for intelligent optimization of digital signal processor (DSP) resource utilization in a media gateway. In one method, it is determined in a media gateway whether predetermined conditions exist for DSP-less IP-IP switching for a call. In response to determining that the predetermined conditions exist, DSP-less IP-IP switching is implemented for the call in the media gateway. After implementing the DSP-less IP-IP switching for the call, it is determined whether a predetermined event occurs that requires insertion of DSP resources during the call. In response to determining that the predetermined event occurs, the DSP resources are inserted into the call during the call. The subject matter described herein for intelligent optimization of DSP resource utilization in a media gateway can be implemented using computer readable medium having stored thereon executable instructions that when executed by the processor of a computer control the computer to perform steps. Exemplary computer readable media suitable for implementing the subject matter described herein include chip memory devices, disk memory devices, programmable logic devices, and application specific integrated circuits. In addition, a computer readable medium that implements the subject matter described herein can be located on a single device or computing platform or may be distributed across multiple devices or computing platforms.

BRIEF DESCRIPTION OF THE DRAWINGS

Preferred embodiments of the subject matter described herein will now be described with reference to the accompanying drawings of which.

DETAILED DESCRIPTION

Figure 1:
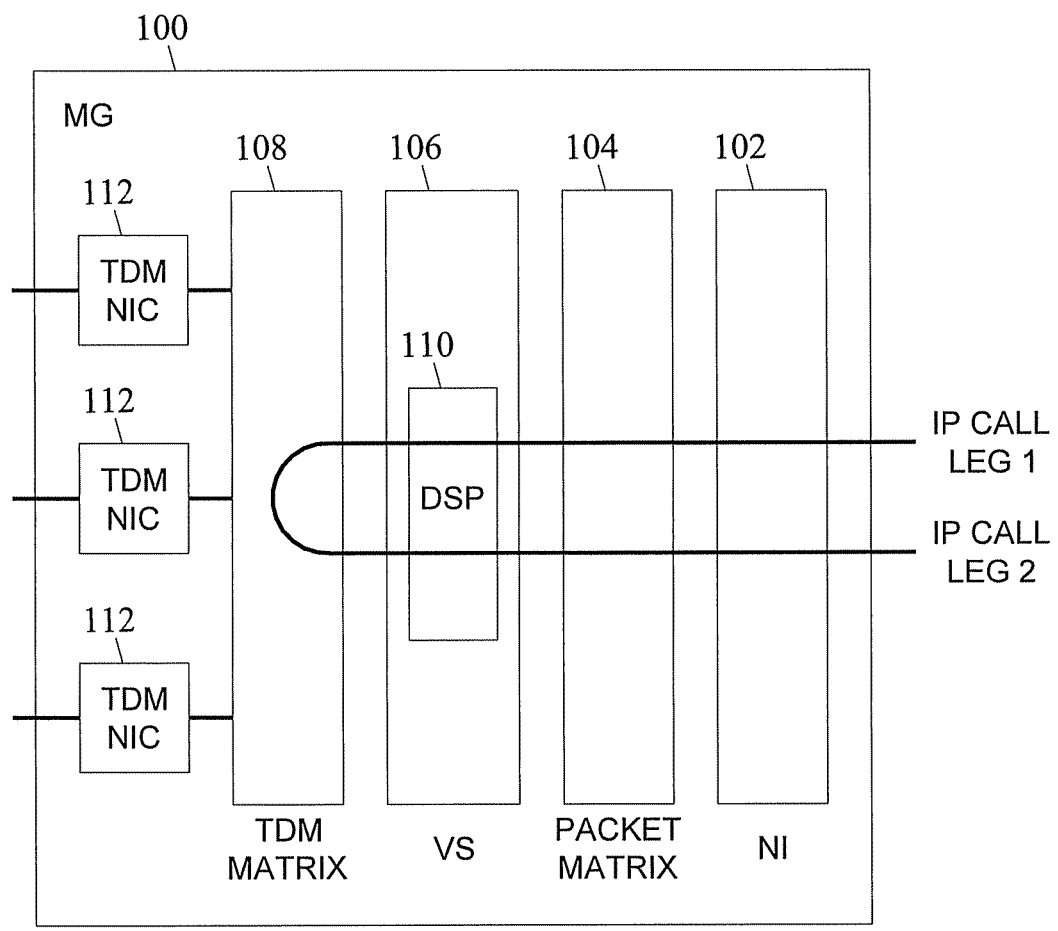
FIG. 1 is a block diagram illustrating exemplary switching of media packets of a media gateway utilizing DSP resources.

The subject matter described herein includes methods, systems, and computer readable media for intelligent optimization of DSP resources in a media gateway. FIG. 1 is a block diagram illustrating call establishment in a media gateway using DSP resources. Referring to FIG. 1, a media gateway 100 includes a network interface 102, a packet switching matrix 104, a voice server 106, and a TDM matrix 108. Voice server 106 may include one or more DSPs 110. When a call is established in a media gateway where the call requires DSP resources, media packets associated with an inbound call leg are forwarded from network interface 102, through packet switching matrix 104, to DSP 110. DSP 110 may convert the incoming codec to Pulse Coded Modulation (PCM) for the media packet through TDM matrix 108, receive the PCM stream from TDM matrix 108, convert the codec from PCM to the codec for the outgoing call leg. DSP 110 may then forward the outbound media packet to the outbound call leg via packet switching matrix 104 and network interface 102.

Figure 2A:
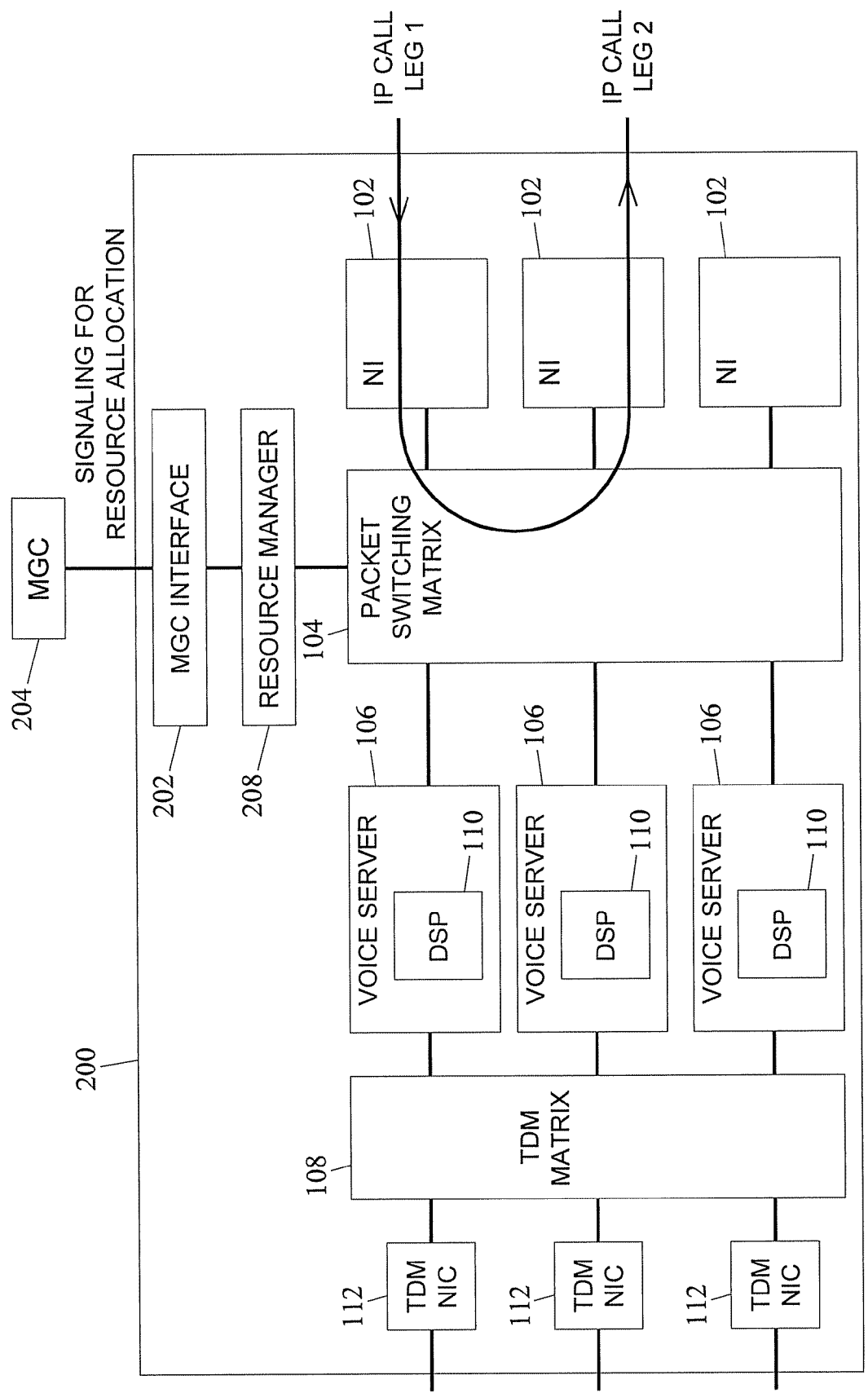
FIG. 2A is a block diagram illustrating a media gateway and a media gateway controller where DSP-less IP-IP switching is implemented from one network interface, through a packet switching matrix, to another network interface according to an embodiment of the subject matter described herein.

Without DSP-less IP-IP switching, the scenario illustrated in FIG. 1 would occur even if the incoming and outgoing codecs were the same and other conditions existed that would allow DSP-less IP-IP switching. Accordingly, as illustrated in FIG. 2A, the subject matter described herein includes establishing DSP-less IP-IP switching for calls that do not require utilization of DSP resources. In FIG. 2A, media gateway 200 includes one or more network interfaces 102, packet switching matrix 104, voice servers 106 with DSPs 110, TDM matrix 108, and TDM NICs 112. In addition, media gateway 200 includes a media gateway controller (MGC) interface 202 for communicating with media gateway controller 204 and a resource manager 208 for inserting and removing DSP resources from a call. In the architecture illustrated in 2A, it is assumed that DSP resources 110 are a shared pool of resources that can be shared among calls whose media packets are switched through the media gateway.

Resource manager 208 may determine based on signaling from media gateway controller 204 via MGC interface 202 whether DSP-less IP-IP switching conditions exist for a call. Exemplary conditions will be described in detail below. In the illustrated example, it is assumed that the conditions for DSP-less IP-IP switching exist. According, resource manager 208 may effect DSP-less IP-IP switching for the call, where effecting DSP-less IP-IP switching for the call includes provisioning the network interface 102 associated with the inbound call leg to switch the media packets for the call to the network interface 102 associated with the outbound call leg through packet switching matrix 104 without involving a DSP 110. This may be accomplished by having the inbound network interface perform header manipulation of the packets and adjust the Ethernet frame in which the packet is carried via packet switching matrix 104 so that the packet will be forwarded from packet switching matrix 104 to the network interface 102 associated with the outbound call leg, rather than one of voice servers 106 for DSP processing. In addition, the inbound network interface or the outbound network interface may perform header manipulation for the call. Header manipulation may include mapping the incoming IP address and port to the appropriate outgoing IP address and port and to update the IP and UDP headers for the outgoing RTP and RTCP packets. The network interface may also re-compute the IP header checksum and the UDP header checksum. These fields may be updated in the outgoing RTCP or RTP packets. In one implementation, the UDP header checksum may be set to zero to save network processor cycles on the network interface cards.

Figure 2B:
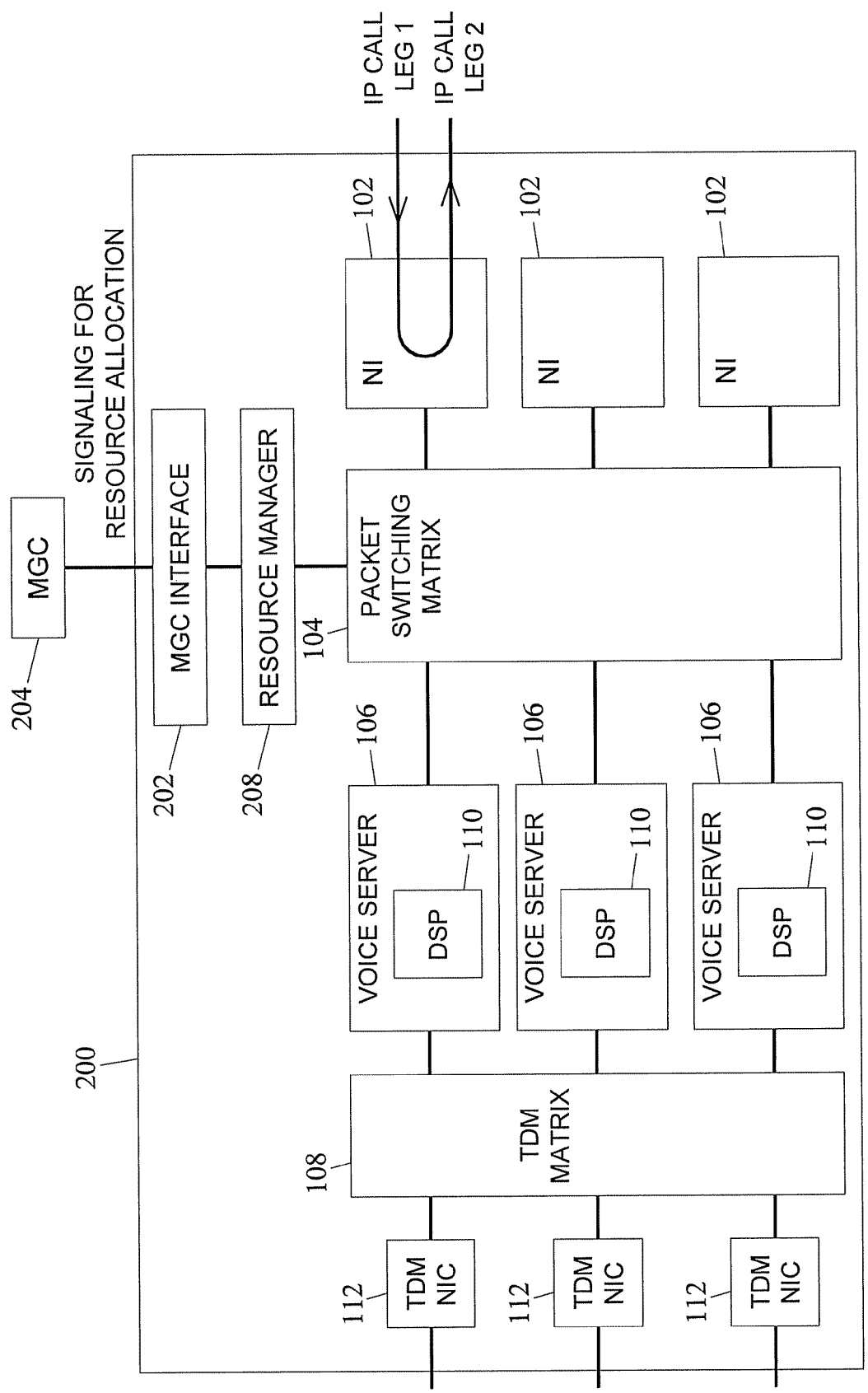
FIG. 2B is a block diagram illustrating a media gateway and a media gateway controller where DSP-less IP-IP switching is implemented exclusively on a network interface according to an embodiment of the subject matter described herein.

FIG. 2B illustrates another example of DSP-less IP-IP switching. In FIG. 2B, it is assumed again that resource manager 208 has determined that the conditions for DSP-less IP-IP switching exist for the call. Accordingly, resource manager 208 provisions network interface 102 to switch media packets associated with the call without involving DSP resources. In the illustrated example, the switching is completely handled by a single network interface. That is, when a media packet arrives on the inbound call leg, network interface 102 performs the header manipulation to the outbound call leg and forwards the packet to the outbound call leg without involving packet switching matrix 104, a voice server 106, or any of DSPs 110.

Figure 2C:
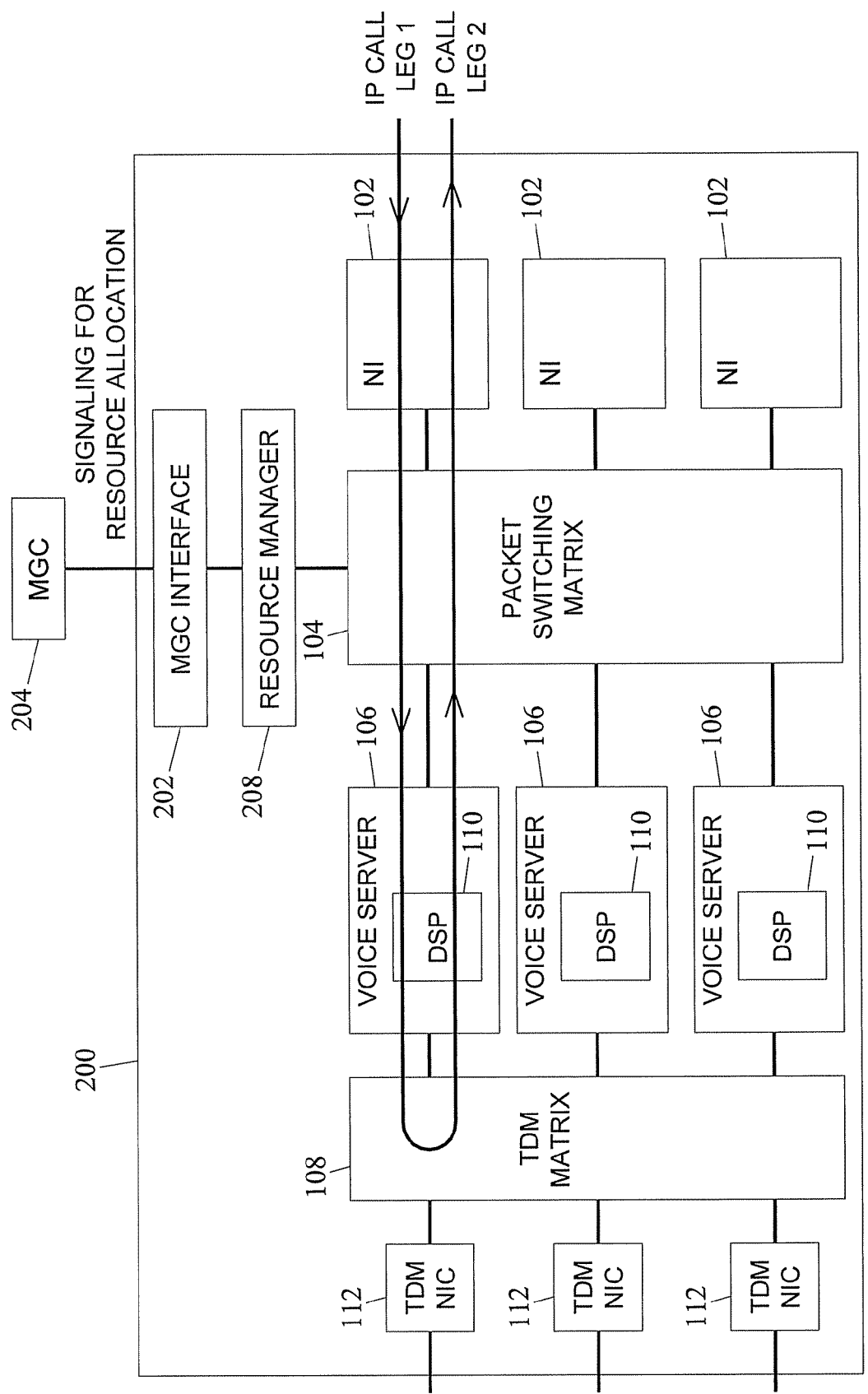
FIG. 2C is a block diagram illustrating a media gateway and a media gateway controller where DSP resources are inserted in the call after initially establishing the call using DSP-less IP-IP switching according to an embodiment of the subject matter described herein.

According to another aspect of the subject matter described herein, DSP resources may be re-inserted into a call if an event occurs that requires DSP resources. For example, when a feature is activated for a call or when the codec associated with the call changes, it may be necessary to insert DSP resources in the call. FIG. 2C illustrates this scenario. In FIG. 2C, it is assumed that the call was initially established using DSP-less IP-IP switching as illustrated in FIG. 2A or 2B. However, when MGC interface 202 receives a command 204 that requires feature activation, resource manager 208 may determine whether the activated feature requires DSP insertion. If resource manager 208 determines that the feature requires DSP insertion, resource manager 208 may allocate a DSP 110 for the call and provision network interface 102 to insert DSP resources in the call. This would involve updating the session table on network interface 102 to indicate that media packets for the incoming call leg should be forwarded to one of voice servers 106. As will be described in more detail below, if the conditions for DSP-less IP-IP switching are satisfied after a DSP resource has been inserted into the call, the call may be re-optimized by removing the DSP resources from the call and freeing those resources for allocation to other calls.

Figure 3:
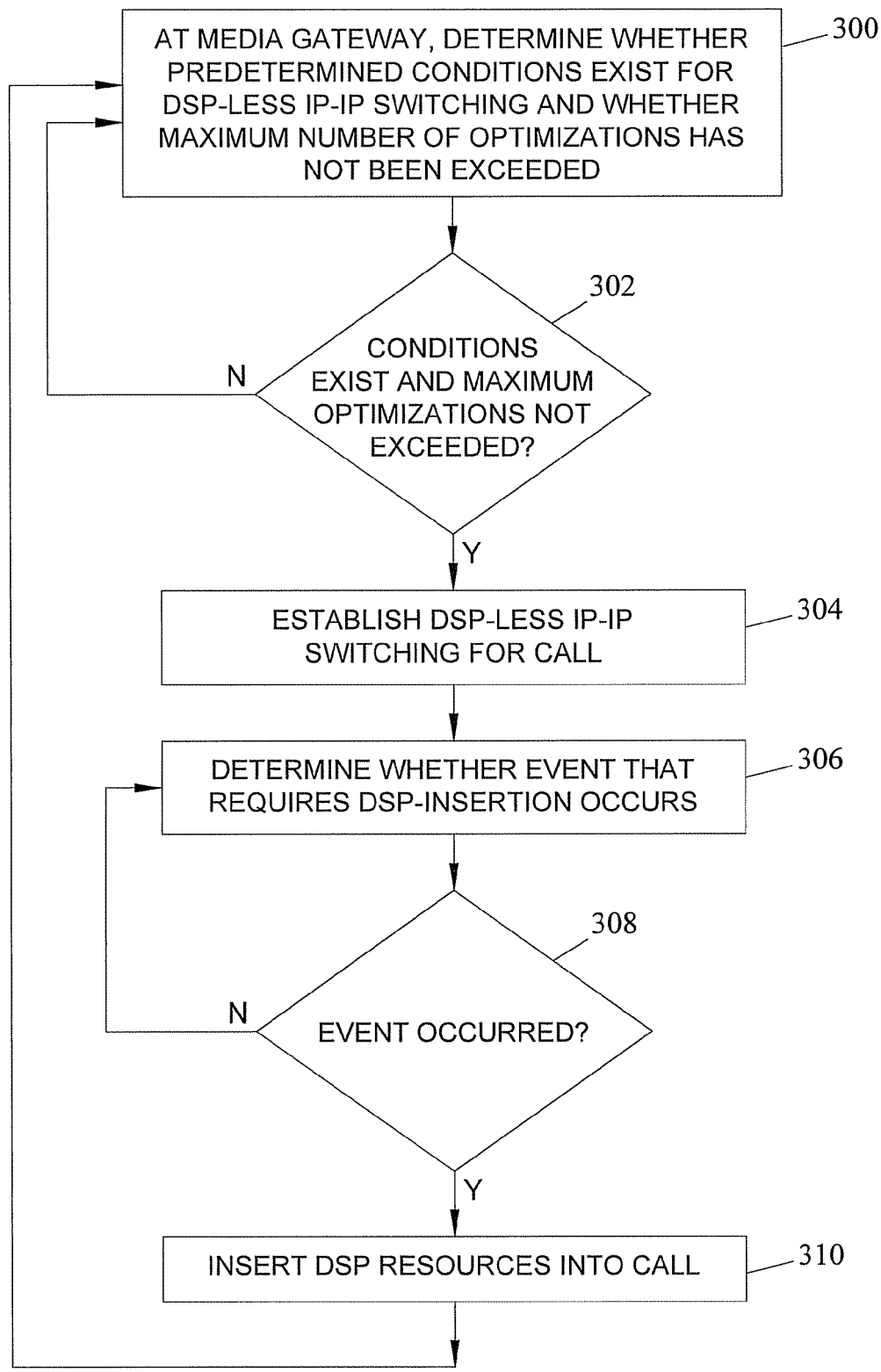
FIG. 3 is a flow chart illustrating exemplary steps for establishing DSP-less IP-IP switching for a call and for inserting DSP resources into a call according to an embodiment of the subject matter described herein.

FIG. 3 is a flow chart illustrating exemplary steps for intelligent optimization of DSP resource utilization in a media gateway according to an embodiment of the subject matter described herein. Referring to FIG. 3, in steps 300 and 302, it is determined whether predetermined conditions exist for DSP-less IP-IP insertion. This determination may be made by resource manager 208 as described above. Exemplary conditions that may indicate that DSP-less IP-IP switching is possible may include the following:

the call is two-party call with only two terminations;
both legs of the call are bi-directional;
both legs of the call use IP transport;
both legs of the call use the same codec and packetization rates;
both legs of the call have identical configurations for silence suppression; and
if RFC 2833 is supported, both legs of the call have identical RFC 2833 configurations.

If all of the above conditions are met, resource manager 208 may determine that the conditions exist for DSP-less IP-IP insertion. RFC 2833 describes methods for carrying DTMF digits, telephony tones, and other signals in RTP payloads. If both sides support this feature, they must have the same configurations for this feature for DSP-less IP-IP switching.

Another determination that is made in steps 300 and 302 is whether or not the maximum number of optimizations has been exceeded for a call. For example, it may be desirable to limit the number of times a call can be optimized, i.e., the number of times that DSP resources can be removed from a call after initial or mid-call DSP insertion. Whether the maximum number of optimizations has been exceeded can be determined by resource manager 208 examining a configurable parameter and the number of the times a call has been optimized. If the number of times would exceed the configurable parameter, it may be desirable not to allow DSP-less IP-IP insertion for the call.

If it is determined that the conditions exist and the maximum number of optimizations has not been exceeded, in step 304, DSP-less IP-IP switching is implemented for the call. DSP-less IP-IP switching may be implemented exclusively by the network interface, as illustrated in FIG. 2B, or by the network interface and packet switching matrix 104, as illustrated in FIG. 2A. Whether the packet switching matrix is involved can depend on whether the network interface for the inbound call leg is the same as that for the outbound call leg. Once DSP-less IP-IP switching is established, when a media packet for the inbound call leg arrives at a network interface, the packet may be switched to the outbound network interface or to the same network interface without being forwarded through a DSP. This switching may be effected by appropriately populating the session table on the inbound network interface so that the packet can be switched to the outbound network interface without being forwarded to a voice server 106.

After DSP-less IP-IP switching is established for a call, the call must be monitored to determine whether an event occurs that requires DSP insertion (steps 306 and 308). Exemplary events that require DSP insertion during the call may include:

feature activation (call hold/retrieve, call transfer, etc.);
conferencing activated;
tone detection/reporting enabled;
change to the bi-directional mode of a call leg; or
a codec change.

If any of the above listed conditions occur, mid-call insertion of DSP resources is required. Mid-call insertion may include resource manager 208 populating the session table on the network interface associated with the inbound call leg before the call through a DSP 206 (step 310).

Once DSP resources are inserted into a call, control returns to step 300 where it is determined whether DSP-less IP-IP switching conditions exist, and the process described above is repeated. Thus, the subject matter described herein allows a DSP initially used in a call to be removed, re-inserted, and re-removed if the conditions for DSP-less IP-IP switching change multiple times during a call. In one example, the call is initially established in IP-IP switching mode because the above enumerated conditions for DSP-less IP-IP switching are met. The call is then changed such that the DSP is inserted in the path (i.e., to play a tone or announcement). In this case, once the tone or announcement is played and the condition that required the DSP is no longer true, resource manager 208 may reestablish DSP-less IP-IP switching.

There are a predetermined number of conditions for which resource manager 208 may determine that DSP-less IP-IP switching is not possible for the call. Examples of such conditions are as follows:

any type of media adaptation is required, such as:
transcoding;
packet rate adjustments;
transport layer interworking (i.e., both call legs are not IP) call is tapped for CALEA;
tone detection/reporting is required;
RFC 2833 interworking is required (one leg has RFC 2833 on while the other leg is off); and
tandem-free operation (TFO) is active.

If any of the above conditions is initially true or becomes true during a call, resource manager 208 may determine that DSP-less IP-IP switching is not or is no longer possible.

As described above, it is desirable that resource manager 208 limit the number of optimizations for a call. This is because frequent optimization (DSP removal) and break (DSP insertion) operations may have a negative effect on the performance of the Media Gateway (in maximum calls per second) and on both the RTP and RTCP streams for the call. Frequent changing of the timestamp and sequence numbers in the RTP stream can result in high rate of packet loss until the receivers re-sync to the new timestamp and sequence numbers. Similarly, RTCP packets may not be sent at the appropriate time, resulting in call failure. In order to minimize the media gateway performance and call quality impacts due to frequent optimization and break operations, as stated above, media gateway 200 may support a configurable parameter that specifies the maximum number of breaks a call may undergo (if not specified, there may be no limit). If the maximum number of breaks is specified and reached for a call, the media gateway will not re-optimize the call even if all of the optimization preconditions are met. The call may remain unoptimized for the life of the call once the maximum number of optimizations is met.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for intelligent optimization of digital signal processor (DSP) resource utilization, the method comprising:
   in a media gateway:
      determining whether predetermined conditions exist for DSP-less Internet protocol to Internet protocol (IP-IP) switching for a call, and in response to determining that the predetermined conditions exist, implementing the DSP-less IP-IP switching for the call in the media gateway, wherein implementing DSP-less IP-IP switching includes receiving a media packet for the call at a packet network interface of the media gateway, identifying the media packet as being for a call for which DSP-less IP-IP switching is indicated, and in response to determining that the media packet as being a media packet for which DSP-less IP-IP switching is indicated, switching the media packet through the media gateway to an outbound call leg associated with the call without using a DSP resource of the media gateway;
      after implementing the DSP-less IP-IP switching for the call, determining whether a predetermined event occurs that requires insertion of DSP resources during the call, and, in response to determining that the predetermined event occurs, inserting, during the call, the DSP resources into the call, wherein the DSP resources are associated with the media gateway already in the call path.

2. The method of claim 1 wherein determining whether the predetermined conditions exist includes determining whether the following conditions are met:
   the call is a two-party call with only two terminations;
   both legs of the call are bi-directional;
   both legs of the call use IP transport;
   both legs of the call use the same codec and packetization rates;
   both legs of the call have identical configurations for silence suppression; and
   if IETF Request for Comments (RFC) 2833 is supported, both legs of the call have identical RFC 2833 configurations.

3. The method of claim 1 wherein determining whether the predetermined conditions exist includes analyzing parameters associated with the call included in signaling messages received from a media gateway controller.

4. The method of claim 1 wherein determining whether the predetermined event occurs includes determining whether one of:
   a feature is activated for the call;
   conferencing is activated for the call;
   tone detection or reporting is enabled for the call;
   a change to a bi-directional mode of the call occurs; or
   a codec change occurs for the call.

5. The method of claim 4 wherein determining whether the predetermined event occurs includes receiving signaling from a media gateway controller regarding the event.

6. The method of claim 1 wherein switching the media packet through the media gateway includes switching the media packet from the packet network interface, through a packet switching matrix, and back to the network interface or another network interface without utilizing the DSP resources for the call.

7. The method of claim 6 wherein switching the media packet through the packet switching matrix includes manipulating at least one header in the media packet before forwarding the media packet to the outbound call leg.

8. The method of claim 1 wherein switching the media packet through the media gateway includes switching the media packet at the network interface to the outbound call leg without utilizing the DSP resources for the call.

9. The method of claim 8 wherein switching the media packet at the network interface includes manipulating at least one header in the media packet before forwarding the media packet to the outbound call leg.

10. The method of claim 1 comprising, in response to determining that the predetermined conditions are not met, continuously evaluating whether the conditions are met and, in response to the conditions being met, establishing the DSP-less IP-IP switching.

11. The method claim 10 comprising limiting a number of times that DSP-less IP-IP switching can be implemented for the call.

12. The method of claim 1 wherein inserting the DSP resources in the call comprises:
   receiving a media packet for the call at a network interface of the media gateway;

identifying the media packet as being associated with a call that requires DSP resources;

forwarding the media packet to a voice server module; and at the voice server module, using a DSP to process the media packet.

13. The system of claim 1 wherein switching the media packet through the media gateway includes switching the media packet from the packet network interface, through a packet switching matrix, and back to the network interface or another network interface without utilizing the DSP resources for the call.

14. The system of claim 13 wherein switching the media packet through the packet switching matrix includes manipulating at least one header in the media packet before forwarding the media packet to the outbound call leg.

15. The system of claim 1 wherein switching the media packet through the media gateway includes switching the media packet at the network interface to the outbound call leg without utilizing the DSP resources for the call.

16. The system of claim 15 wherein switching the media packet at the network interface includes manipulating at least one header in the media packet before forwarding the media packet to the outbound call leg.

17. A system for intelligent optimization of digital signal processor (DSP) resource utilization, the system comprising:

a media gateway;

a resource manager located in the media gateway configured to determine whether predetermined conditions exist for DSP-less Internet protocol to Internet protocol (IP-IP) switching for a call, and in response to determining that the predetermined conditions exist, implement the DSP-less IP-IP switching for the call in the media gateway, wherein implementing DSP-less IP-IP switching includes receiving a media packet for the call at a packet network interface of the media gateway, identifying the media packet as being for a call for which DSP-less IP-IP switching is indicated, and in response to determining that the media packet as being a media packet for which DSP-less IP-IP switching is indicated, switching the media packet through the media gateway to an outbound call leg associated with the call without using a DSP resource of the media gateway; and wherein, after implementing the DSP-less IP-IP switching for the call, the resource manager is configured to determine whether a predetermined event occurs that requires insertion of DSP resources during the call, and in response to determining that the predetermined event occurs, insert, during the call, the DSP resources into the call, wherein the DSP resources are associated with the media gateway already in the call path.

18. The system of claim 17 wherein determining whether the predetermined conditions exist includes determining whether the following conditions are met:

the call is a two-party call with only two terminations;

both legs of the call are bi-directional;

both legs of the call use IP transport;

both legs of the call use the same codec and packetization rates;

both legs of the call have identical configurations for silence suppression; and if IETF Request for Comments (RFC) 2833 is supported, both legs of the call have identical RFC 2833 configurations.

19. The system of claim 17 wherein determining whether the predetermined conditions exist includes analyzing parameters associated with the call included in signaling messages received from a media gateway controller.

20. The system of claim 17 wherein determining whether the predetermined event occurs includes determining whether one of:

a feature is activated for the call;

conferencing is activated for the call;

tone detection or reporting is enabled for the call;

a change to a bi-directional mode of the call occurs; or a codec change occurs for the call.

21. The system of claim 20 wherein determining whether the predetermined event occurs includes receiving signaling from a media gateway controller regarding the event.

22. The system of claim 17 comprising, in response to determining that the predetermined conditions are not met, continuously evaluating whether the conditions are met and, in response to the conditions being met, establishing the DSP-less IP-IP switching.

23. The system claim 22 comprising limiting a number of times that DSP-less IP-IP switching can be implemented for the call.

24. The system of claim 17 wherein inserting the DSP resources in the call comprises:

receiving a media packet for the call at a network interface of the media gateway;

identifying the media packet as being associated with a call that requires DSP resources; and forwarding the media packet to a voice server module;

at the voice server module, using a DSP to process the media packet.

25. A non-transitory computer readable medium having stored thereon executable instructions that when executed by the processor of a computer control the computer to perform steps comprising:

in a media gateway:

determining whether predetermined conditions exist for DSP-less Internet protocol to Internet protocol (IP-IP) switching for a call, and, in response to determining that the predetermined conditions exist, implementing the DSP-less IP-IP switching for the call in the media gateway, wherein implementing DSP-less IP-IP switching includes receiving a media packet for the call at a packet network interface of the media gateway, identifying the media packet as being for a call for which DSP-less IP-IP switching is indicated, and in response to determining that the media packet as being a media packet for which DSP-less IP-IP switching is indicated, switching the media packet through the media gateway to an outbound call leg associated with the call without using a DSP resource of the media gateway;

after implementing the DSP-less IP-IP switching for the call, determining whether a predetermined event occurs that requires insertion of DSP resources during the call, and in response to determining that the predetermined event occurs, inserting, during the call, the DSP resources into the call, wherein the DSP resources are associated with the media gateway already in the call path.

* * * * *